United States Patent
Kim et al.

(10) Patent No.: US 7,168,860 B2
(45) Date of Patent: Jan. 30, 2007

(54) ASSEMBLY OF PASSIVE SOCKET AND PLUG FOR OPTICAL HOME NETWORK

(75) Inventors: Lae-Kyoung Kim, Suwon-si (KR); Do-In Choi, Yongin-si (KR); Yun-Je Oh, Yongin-si (KR); Hee-Won Cheung, Suwon-si (KR); Jong-Hun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 289 days.

(21) Appl. No.: 10/861,068

(22) Filed: Jun. 4, 2004

(65) Prior Publication Data
US 2005/0152651 A1    Jul. 14, 2005

(30) Foreign Application Priority Data
Jan. 14, 2004    (KR)    ............... 10-2004-0002624

(51) Int. Cl.
*G02B 6/38*    (2006.01)
(52) U.S. Cl. .............................. 385/62; 385/55; 385/59
(58) Field of Classification Search ................. 385/62, 385/55, 59
See application file for complete search history.

(56) References Cited

U.S. PATENT DOCUMENTS

| | | | | |
|---|---|---|---|---|
| 5,136,681 A * | 8/1992 | Takahashi | .................. | 385/140 |
| 5,175,780 A * | 12/1992 | Sano et al. | .................... | 385/47 |
| 5,337,388 A * | 8/1994 | Jacobowitz et al. | .......... | 385/76 |
| 6,375,362 B1 * | 4/2002 | Heiles et al. | ................. | 385/75 |
| 6,741,776 B2 * | 5/2004 | Iwashita et al. | .............. | 385/49 |
| 6,899,464 B2 * | 5/2005 | Stevens et al. | ............... | 385/53 |
| 2001/0043775 A1 * | 11/2001 | Shirakawa et al. | ........... | 385/59 |
| 2003/0072541 A1 * | 4/2003 | Ban et al. | ..................... | 385/92 |

* cited by examiner

*Primary Examiner*—Frank G. Font
*Assistant Examiner*—James P. Hughes
(74) *Attorney, Agent, or Firm*—Cha & Reiter, L.L.C.

(57) ABSTRACT

An assembly for an optical home network includes a socket having input and output optical fibers, for transmitting optical signals, installed at corresponding positions of both sides of a connection hole. The assembly further includes a plug connected to a device and including input and output optical transmission lines respectively connected to the input and output optical fibers when the plug is inserted into the connection hole of the socket so as to be connected to the socket. The optical signals transmitted through the input and output optical fibers pass through the socket when the plug is not connected to the passive socket, and are transmitted to the device through the plug when the plug is connected to the socket.

20 Claims, 6 Drawing Sheets

ASSEMBLY OF PASSIVE SOCKET AND PLUG FOR OPTICAL HOME NETWORK

CLAIM OF PRIORITY

This application claims priority to an application entitled "ASSEMBLY OF PASSIVE SOCKET AND PLUG FOR OPTICAL HOME NETWORK," filed in the Korean Intellectual Property Office on Jan. 14, 2004 and assigned Serial No. 2004-2624, the contents of which are hereby incorporated herein by reference.

BACKGROUND OF THE INVENTION

1. Field of the Invention

The present invention relates to an optical home network system having a backbone-type structured optical communication network using an optical cable, and more particularly to an assembly of a passive socket and a plug for an optical home network.

2. Description of the Related Art

Generally, various devices including information devices such as a PC, communication devices such as a telephone, broadcasting devices such as a TV, A/V (Audio and Video) devices such as a DVD (Digital Video Disc) player and a digital camera are used in the home. The above devices are interconnected to form a network, and then the obtained home network is interworked with various external networks, thereby being conveniently used by users. Such a home network is proposed to have various structures. Recently, an optical home network that utilizes an optical cable has become popular.

For optical home networks having a backbone structure obtained by laying the optical cable under a house or building, maintaining optical power as the distance between nodes increases requires the installation of repeaters at predetermined distances, or if a new node is added, an adapter (or socket) for interworking a device (node) provided with an optical transceiver.

The above adapter for the conventional optical home network is built in or has a structure connected only to the device. Each device to be connected thus requires a new socket and is connectable to the socket by inserting a plug connected to the device into the socket. Services to various electric and electronic devices are therefore easily and conveniently provided when needed. That is, the socket for the optical home network is configured such that it passes optical signals under the condition that a plug is not connected to the socket, and transmits the optical signals to the device through the plug under the condition that the plug is connected to the socket.

SUMMARY OF THE INVENTION

The present invention has been made in view of the above problems, and it is an object of the present invention to provide an assembly of a passive socket and a plug for an optical home network, which is easily and conveniently used by users.

It is another object of the present invention to provide an assembly of a passive socket and a plug for an optical home network, in which the socket passes optical signals under the condition that the plug is not connected to the passive socket and transmits the optical signals to a device through the plug under the condition that the plug is connected to the passive socket.

It is yet another object of the present invention to provide an enduring and easily manufactured assembly of a passive socket and a plug for an optical home network.

In accordance with the present invention, the above and other objects can be accomplished by the provision of an assembly for an optical home network that includes a socket having input and output optical fibers, for transmitting optical signals, installed at corresponding positions of both sides of a connection hole. The assembly also includes a plug connected to a device and including input and output optical transmission lines respectively connected to the input and output optical fibers when the plug is inserted into the connection hole of the socket so as to be connected to the socket. The optical signals transmitted through the input and output optical fibers pass through the socket when the plug is not connected to the passive socket, and are transmitted to the device through the plug when the plug is connected to the socket.

BRIEF DESCRIPTION OF THE DRAWINGS

The above and other objects, features and other advantages of the present invention will be more clearly understood from the following detailed description taken in conjunction with the accompanying drawings, in which:

FIG. 2b is a side view of FIG. 2a;

DETAILED DESCRIPTION

Preferred embodiments of the present invention are described in detail with reference to the annexed drawings. In the following description, a variety of specific elements such as constituent elements are described only to afford a better understanding of the present invention. Those skilled in the art will appreciate that various modifications, additions, and substitutions to the specific elements are possible, without departing from the scope and spirit of the invention as disclosed in the accompanying claims.

Figure 1A:
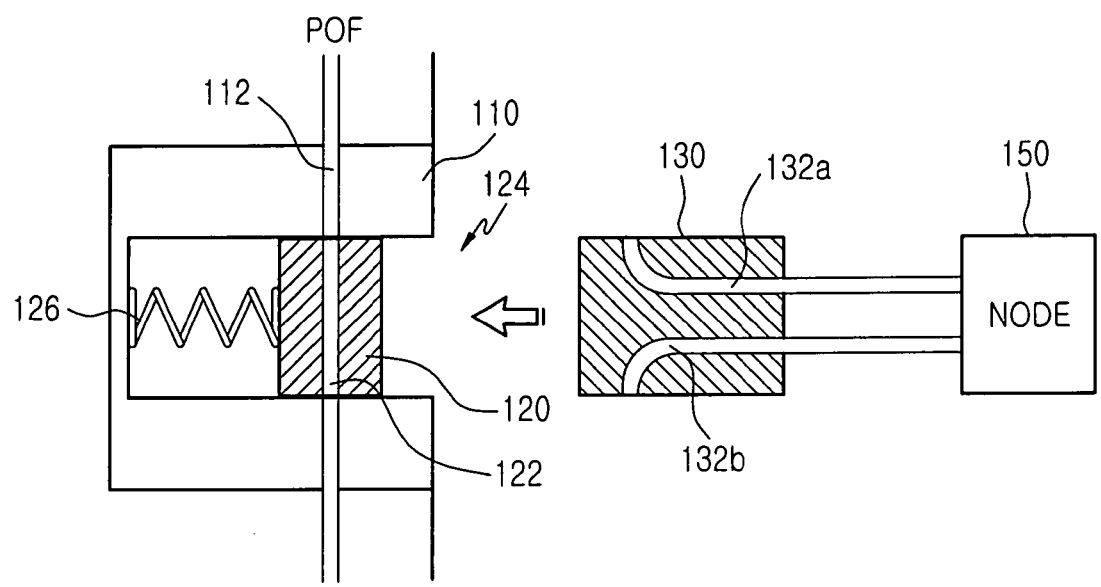
FIGS. 1a and 1b are schematic views of a passive socket and a plug for a home network in accordance with a first embodiment of the present invention.
Figure 1B:
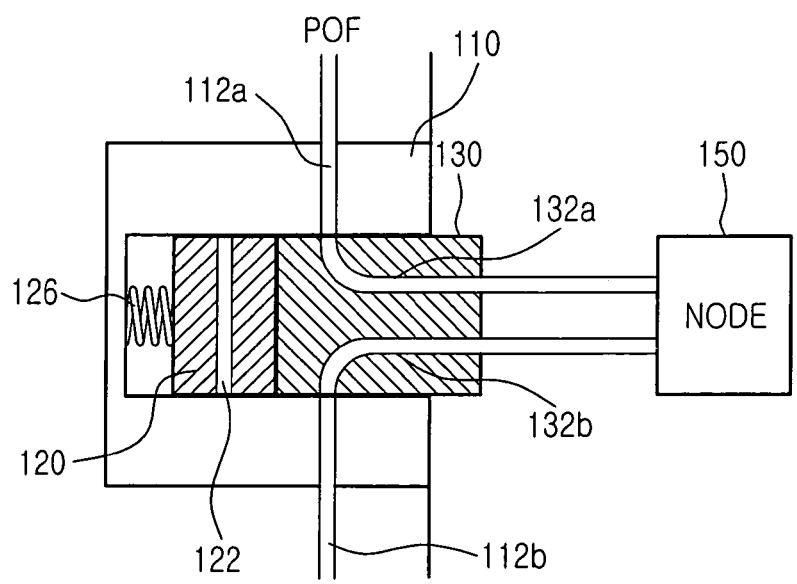

FIGS. 1a and 1b are schematic views of a passive socket 110 and a plug 130 for a home network in accordance with a first embodiment of the present invention. FIG. 1a illustrates a state in which the plug 130 is not connected to the socket 110 and is therefore in a state of non-insertion, and FIG. 1b illustrates a state in which the plug 130 is connected to the socket 110 and is in a state of insertion. With reference to FIGS. 1a and 1b, an input optical fiber 112a and an output optical fiber 112b, for example, consisting of POFs (Plastic Optical Fibers), for transmitting an optical signal are installed at both terminals of the socket 110 built into a wall at a proper position in a building in which a home network is installed. Although 112a, 112b designate the input and output optical fibers, respectively, signaling may travel in the opposite direction so that 112a, 112b designate, in effect, the output and input optical fibers, respectively. The above input and output optical fibers 112a, 112b are respectively positioned at opposite portions of a connection hole 124, into which the plug 130 is inserted, such that an end of the input optical fiber 112a aligns with an end of the output optical fiber 112b. To pass the optical signals transmitted through the input and output optical fibers 112a, 112b under the condition that the plug 130 is not inserted into the connection hole 124 of the socket 110, the connection hole 124 of the socket 110 is provided with an optical fiber connection member 120 including a connection optical transmission line 122 for connecting the ends of the input and output optical fibers 112a, 112b. When the plug 130 is inserted into the connection hole 124, the optical fiber connection member 120 is pushed into the bottom of the connection hole 124 by the plug 130. When that the plug 130 is not within the connection hole 124, the optical fiber connection member 120 is biased to assume a position at a predetermined distance from the bottom of the connection hole 124 by the elastic force of a spring 126 so that the connection optical transmission line 122 aligns with the ends of the input and output optical fibers 112a, 112b.

The plug 130 connected to a node (or a device) 150 includes input and output optical transmission lines 132a, 132b consisting of optical waveguides, and configured such that an end of the input optical transmission line 132a is aligned with the input optical fiber 112a and an end of the output optical transmission line 132b is aligned with the output optical fiber 112b when the plug 130 is inserted into the connection hole 124 in connecting to the socket 110. Each of the input and output optical transmission lines 132a, 132b positioned in the plug 130 is gently turned by an angle of 90 degrees so that the traveling direction of an optical signal changes by 90 degrees for entry into the node 150. Accordingly, when the plug 130 is connected to the socket 110, an optical signal inputted through the input optical fiber 112a is inputted to a light reception element of the node 150 through the input optical transmission line 132a and is then processed by the node. An optical signal outputted from the node 150 is transmitted to the output optical fiber 112b through the output optical transmission line 132b of the plug 130.

As shown in FIGS. 1a and 1b, in the socket 110 and the plug 130 in accordance with the present invention, under the condition that the plug 130 is not connected to the socket 110, the optical signals transmitted through the input and output optical fibers 112a, 112b pass through the socket 110 through the optical fiber connection member 120; whereas, under the condition that the plug 130 is connected to the socket 110, the optical signals are transmitted through the plug 130 to the node 150.

Figure 2A:
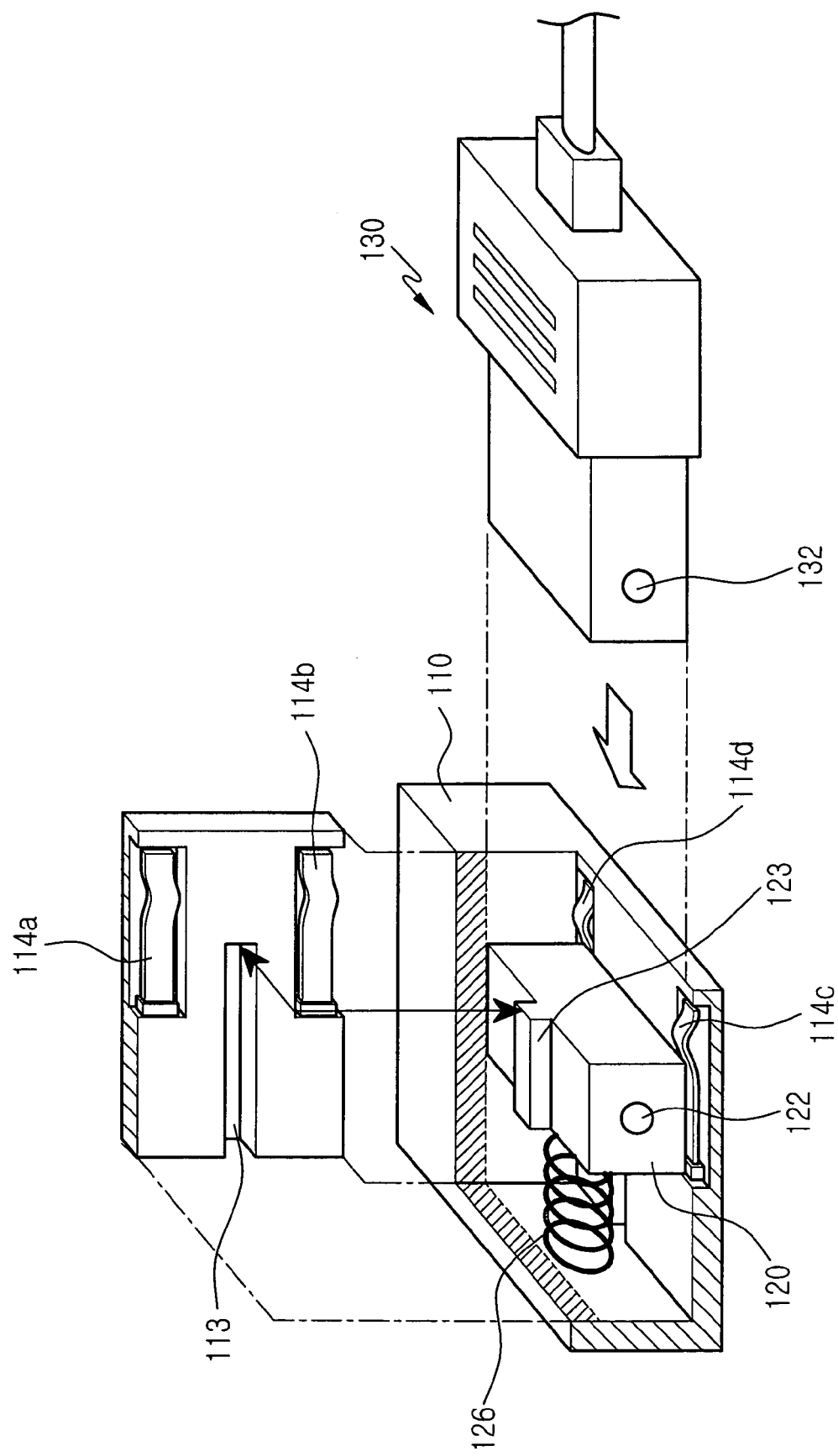
FIG. 2a illustrates an exploded view and a cross-sectional view of the passive socket and the plug shown in FIGS. 1a and 1b.
Figure 2B:
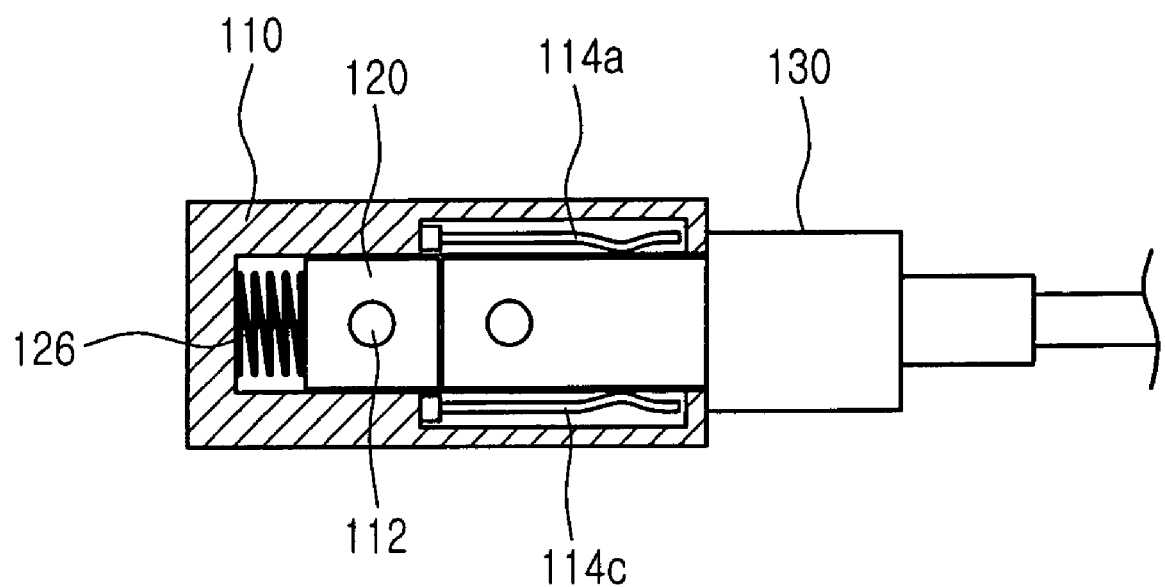

Hereinafter, with reference to FIGS. 2a and 2b, structures of the socket 110 and the plug 130 in accordance with the present invention will be described in detail. FIG. 2a illustrates an exploded view and a cross-sectional view of the passive socket 110 and the plug 130 shown in FIGS. 1a, 1b, and FIG. 2b is a side view of FIG. 2a. First, as shown in FIG. 2a, a plurality of plate springs 114a, 114b, 114c, 114d are provided on upper and lower surfaces (or side surfaces) of the connection hole 124 of the socket 110, and provide pressure to the plug 130 inserted into the connection hole so that the inserted state of the plug into the connection hole is maintained. Further, a retaining protrusion 123 having a proper shape is formed at one side surface of the optical fiber connection member 120 positioned in the connection hole 124 of the socket 110, and a guide groove 113 is formed on a surface (upper surface) of the connection hole 124 corresponding to the retaining protrusion 123 so that the retaining protrusion slidably moves in the guide groove. When the optical fiber connection member 120 is taken out of the connection hole 124 by the spring 126, the retaining protrusion 123 is caught by the end of the guide groove 113 so that the optical fiber connection member 120 is positioned at a predetermined position, thereby allowing the connection optical transmission line 122 to be aligned with the input and output optical fibers 112a, 112b.

The socket 110 having the above-described structure, in which parts such as the optical fiber connection member 120 and the spring 126 are provided in the connection hole 124, has a remarkably reduced endurance due to mechanical abrasion or physical fatigue generated by the frequency of usage, requiring that the socket be repaired repaired. Accordingly, in order to solve the above drawback, sockets in accordance with other embodiments of the present invention do not include the optical fiber connection member 120 and the spring 126 in the connection hole 124.

Figure 3A:
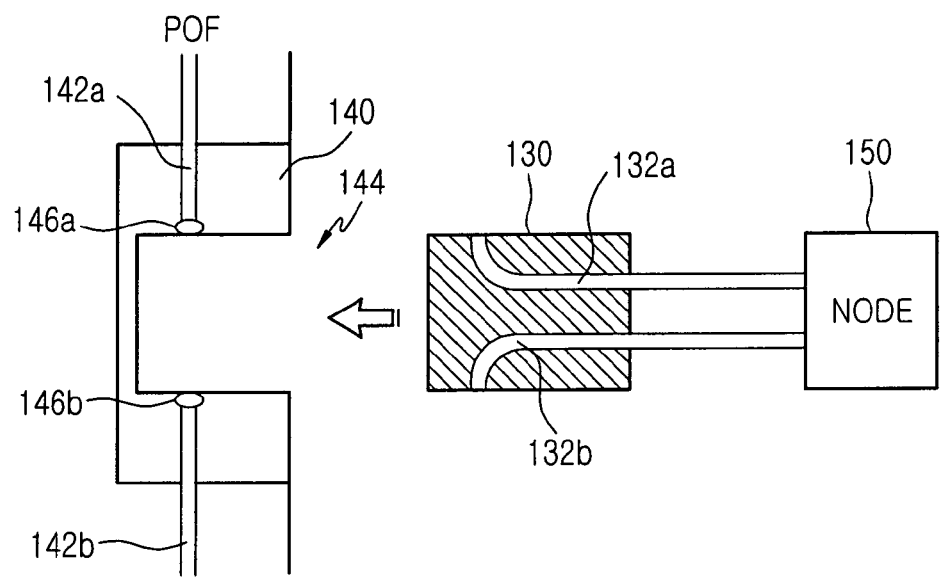
FIGS. 3a and 3b are schematic views of a passive socket and a plug for a home network in accordance with a second embodiment of the present invention.
Figure 3B:
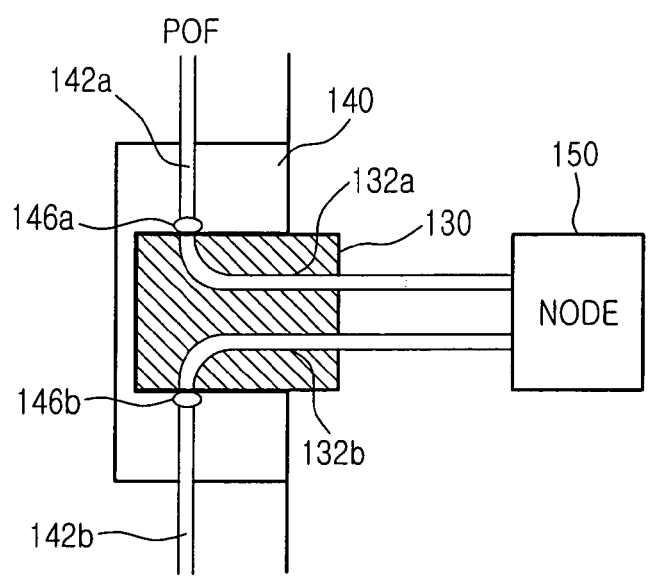

FIGS. 3a and 3b are schematic views of a passive socket 140 and the plug 130 for a home network in accordance with a second embodiment of the present invention. FIG. 3a illustrates a state in which the plug 130 is not connected to the socket 140, and FIG. 1b illustrates a state in which the plug 130 is connected to the socket 140. With reference to FIGS. 3a, 3b, an input optical fiber 142a and an output optical fiber 142b, for example, consisting of POFs (Plastic Optical Fibers), for transmitting an optical signal are installed at both terminals of the socket 140. The above input and output optical fibers 142a, 142b are respectively positioned at opposite portions of a connection hole 144, into which the plug 130 is inserted, such that an end of the input optical fiber aligns with an end of the output optical fiber. Lenses 146a, 146b, which are properly focused, are respectively formed on the ends of the input and output optical fibers 142a, 142b to pass the optical signals transmitted through the input and output optical fibers when the plug 130 is not inserted into the connection hole 144. Ball lenses are used as the lenses 146a, 146b. The lenses 146a, 146b are properly designed such that the optical signals at the ends of the input and output optical fibers 142a and 142b pass each other through the connection hole 144.

In the same manner as the first embodiment shown in FIGS. 1a, 1b, the plug 130 connected to the node (or device) 150 includes the input and output optical transmission lines 132a, 132b configured such that an end of the input optical transmission line 132a is aligned with the input optical fiber 142a, and an end of the output optical transmission line 132b is aligned with the output optical fiber 142b, when the plug 130 is inserted into the connection hole 144.

When the plug 130 is connected to the socket 140, the optical signals transmitted through the input and output optical fibers 142a, 142b are transmitted through the plug 130 to the node 150.

Compared to the conventional socket, the passive sockets in accordance with the above-described embodiments of the present invention allow a new node to be easily attached thereto and detached therefrom. The above passive sockets have a structure employing POFs (Plastic Optical Fibers) requiring a light source, which has a small limit to light convergence, but may have a structure employing general optical fibers. Hereinafter, such a structure of passive sockets employing general optical fibers will be described with reference to accompanying drawings.

Figure 4A:
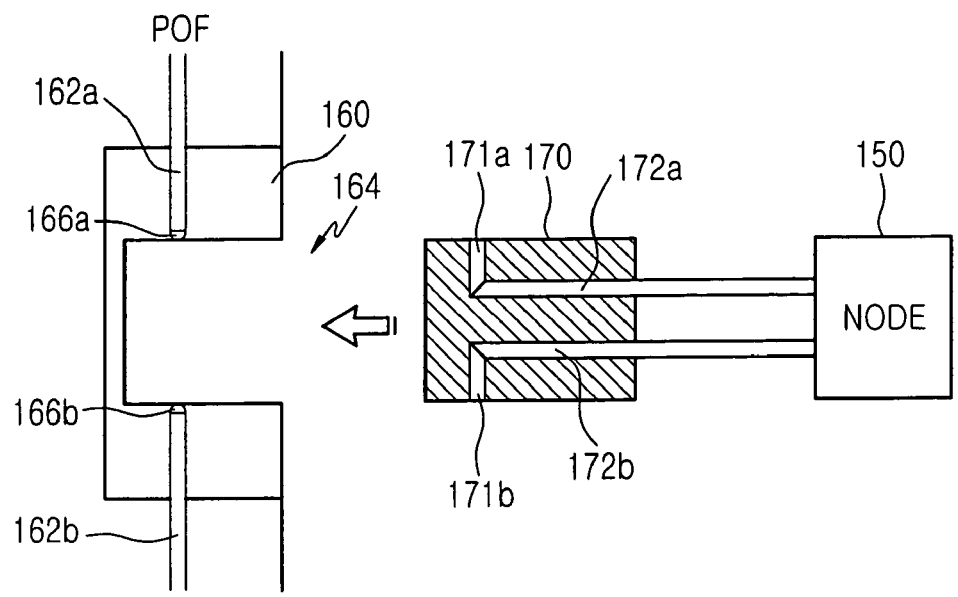
FIGS. 4a and 4b are schematic views of a passive socket and a plug for a home network in accordance with a third embodiment of the present invention.
Figure 4B:
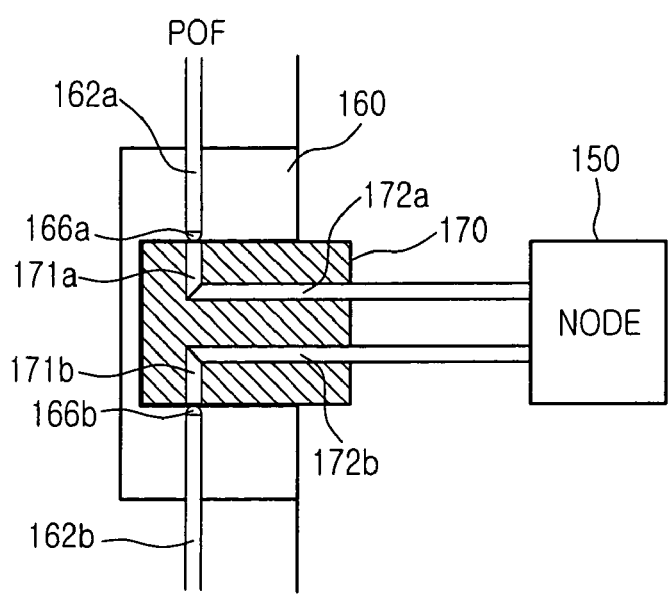

FIGS. 4a and 4b are schematic views of a passive socket 160 and a plug 170 for a home network in accordance with a third embodiment of the present invention. FIGS. 4b, 4a illustrate respective states in which the plug 170 is and is not connected to the socket 160. With reference to FIGS. 4a, 4b, an input optical fiber 162a and an output optical fiber 162b, consisting of general OFs (Optical Fibers), for transmitting an optical signal are installed at both terminals of the socket 160. The above input and output optical fibers 162a, 162b are respectively positioned at opposite portions of a connection hole 164, into which the plug 170 is inserted, such that an end of the input optical fiber 162a aligns with an end of the output optical fiber 162b. To allow the optical signals transmitted through the input and output optical fibers 162a, 162b to be transmitted to ends of the output and input optical fibers 162b, 162a through the connection hole 164 under the condition that the plug 170 is not inserted into the connection hole 164 of the socket 160, GRIN (Gradient Index) lenses (or ball lenses or index matching jell lenses) 166a, 166b obtained by depositing a thin film are properly attached to the ends of the input and output optical fibers 162a, 162b, thereby improving the rectilinear propagation of light. The optical signals, having passed through the GRIN lenses 166a, 166b, maintain rectilinear propagation thereof, and travel through a space in the connection hole 164 without generating light reflex, thus being transmitted through the input and output optical fibers 162a, 162b.

The plug 170 connected to the node (or device) 150 includes the input and output optical transmission lines 172a, 172b made of general optical fibers and disposed perpendicularly to the input and output optical fibers 162a, 162b in the socket 160. When the plug 170 is in the inserted position, the input and output optical transmission lines 172a, 172b are configured such that an end of the input optical transmission line 172a is aligned with the input optical fiber 162a through an input hole 171a formed in the plug 170, and an end of the output optical transmission line 172b is aligned with the output optical fiber 162b through an output hole 171b formed in the plug 170. The ends of the input and output optical transmission lines 172a, 172b, aligned with the input and output optical fibers 162a, 162b for inputting and outputting optical signals to and from the corresponding one of the input and output optical fibers, are cut by an angle of 45 degrees. GRIN lenses (not shown) obtained by depositing a thin film are formed on the cut planes of the ends of the input and output optical transmission lines 172a, 172b.

In the structures of the socket 160 and the plug 170 as shown in FIGS. 4a, 4b, in case that the plug 170 is not connected to the socket 160, the optical signals transmitted through the input and output optical fibers 162a, 162b pass through the GRIN lenses 166a, 166b, pass each other, and then pass through the socket 160. On the other hand, when the plug 170 is connected to the socket 160, the optical signal, having passed through the GRIN lens 166a of the input optical fiber 162a, is inputted to the GRIN lens of the input optical transmission line 172a through the input hole 171a of the plug 170, changes its traveling route by an angle of 90 degrees and is transmitted to an optical transceiver of the node 150. The optical signal transmitted from the optical transceiver of the node 150 is outputted from the GRIN lens of the output optical transmission line 172b and is transmitted to the output optical fiber 162b of the socket 160 through the output hole 171b of the plug 170.

Figure 5A:
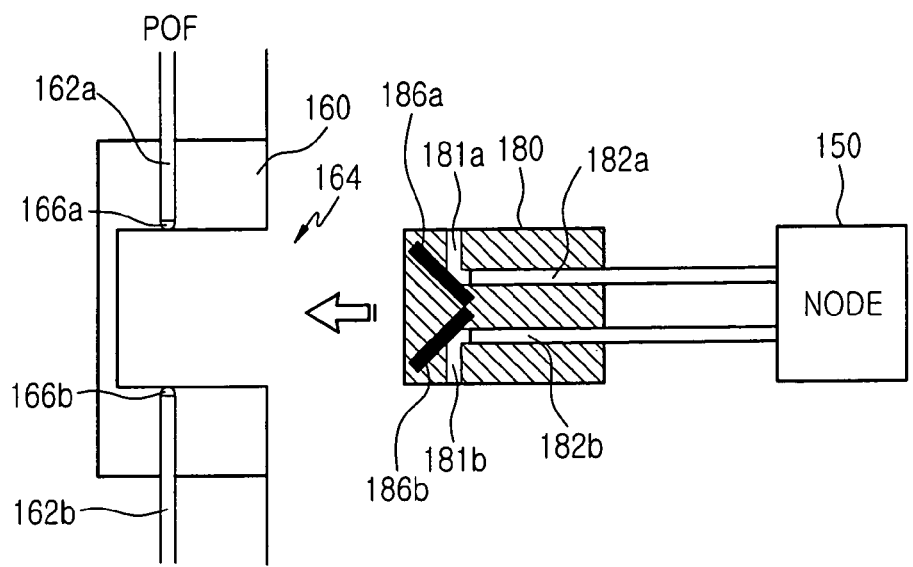
FIGS. 5a and 5b are schematic views of a passive socket and a plug for a home network in accordance with a fourth embodiment of the present invention.
Figure 5B:
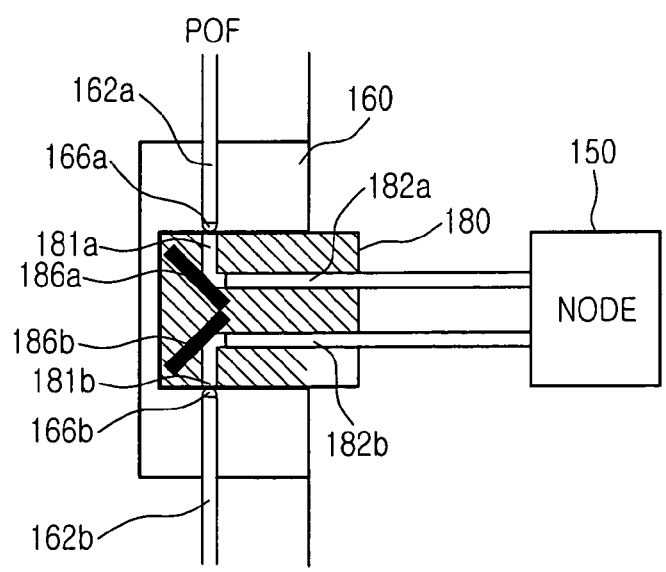

FIGS. 5a and 5b are schematic views of the passive socket 160 and a plug 180 for a home network in accordance with a fourth embodiment of the present invention. FIG. 5a illustrates a state in which the plug 180 is not connected to the socket 160, and FIG. 5b illustrates a state in which the plug 180 is connected to the socket 160. With reference to FIGS. 5a, 5b, in the same manner as the third embodiment shown in FIGS. 4a, 4b, the input optical fiber 162a and the output optical fiber 162b, made of general OFs (Optical Fibers), for transmitting an optical signal are installed at both terminals of the socket 160. The GRIN (Gradient Index) lenses 166a, 166b obtained by depositing a thin film are attached to ends of the input and output optical fibers 162a, 162b, thereby maintaining the rectilinear propagation of light and allowing the optical signals outputted from one of the GRIN lenses to be transmitted to the opposite one of the GRIN lenses.

The plug 180 connected to the node (or device) 150 includes input and output optical transmission lines 182a, 182b made of general optical fibers and disposed perpendicularly to the input and output optical fibers 162a, 162b in the plug 180. The plug 180 includes a first mirror 186a for reflecting light transmitted from the input optical fiber 162a through an input hole 181a formed in the plug at an angle of 45 degrees, allowing the reflected light to be incident on the input optical transmission line 182a. The plug 180 also has a second mirror 186b for reflecting light outputted from the output optical transmission line 182b at an angle of 45 degrees, allowing the reflected light to be incident on the output optical fiber 162b.

In the structures of the socket 160 and the plug 180 as shown in FIGS. 5a, 5b, when the plug 180 is not connected to the socket 160, the optical signals transmitted through the input and output optical fibers 162a, 162b pass through the GRIN lenses 166a, 166b, pass each other, and then pass through the socket 160. On the other hand, when the plug 180 is connected to the socket 160, the optical signal, having passed through the GRIN lens 166a of the input optical fiber 162a, passes through the input hole 181a of the plug 180, is reflected by the first mirror 186a, is inputted to the input optical transmission line 182a and is then transmitted to the node 150. The optical signal transmitted from the node 150 is outputted from the output optical transmission line 182, passes through the output hole 181b and is then transmitted to the output optical fiber 162b of the socket 160.

As apparent from the above description, the present invention provides an assembly of a passive socket and a plug for an optical home network, in which optical signals pass through the passive socket under the condition that the plug is not connected to the passive socket and, when the plug is connected, are transmitted to and from a device through the plug, thereby affording ease of manufacture, endurance and convenience to users.

Although only preferred embodiments of the present invention have been described in detail, those skilled in the art will appreciate that various modifications, additions, and substitutions to the specific elements are possible, without departing from the scope and spirit of the invention as disclosed in the accompanying claims. For example, plugs as shown in FIGS. 4a and 4b and FIGS. 5a and 5b may be connected to sockets as shown in FIGS. 1a and 1b and the FIGS. 2a and 2b. Further, a plug as shown in FIGS. 1a and 1b may be connected to a socket as shown in FIGS. 4a and 4b.

What is claimed is:

1. An assembly for an optical home network comprising:
a passive socket having a connection hole with a pair of opposite sides, the socket including input and output optical fibers that are for transmitting optical signals and that are installed at corresponding positions of said sides; and a plug that is inserted into the socket in a state of insertion in which the plug is disposed within the connection hole of the socket so as to be connected to the socket and that is removed from the socket in a state of non-insertion, the plug being connected to a device and including input and output optical transmission lines that are respectively connected to the input and output optical fibers when the plug is in the state of insertion, wherein the assembly is configured to transmit the optical signals from one optical fiber to another optical fiber of the socket when the plug is in said state of non-insertion, and to transmit the optical signals to the optical transmission lines of the plug when the plug is in said state of insertion.

2. The assembly as set forth in claim 1, wherein the connection hole has a bottom, said assembly further comprising:

an optical fiber connection member installed in the connection hole of the socket, provided with connection optical lines positioned such that they correspond to ends of the input and output optical fibers when the plug is in said state of non-insertion so as to connect the ends of the input and output optical fibers, and pushed into the bottom of the connection hole by the plug when the plug is in said state of insertion; and a spring for pushing the optical fiber connection member outwardly by means of elastic force during a transition from said state of insertion to said state of non-insertion.

3. The assembly as set forth in claim 2, wherein said optical signals transmitted through the input and output optical fibers are further transmitted through the plug to the output transmission line when the plug is in said state of insertion.

4. The assembly as set forth in claim 3, wherein said corresponding positions are mutually, rectilinearly aligned.

5. The assembly as set forth in claim 2, wherein said corresponding positions are mutually, rectilinearly aligned.

6. The assembly as set forth in claim 2, wherein the input and output optical fibers are POFs (Plastic Optical Fibers).

7. The assembly as set forth in claim 6, wherein said optical signals transmitted through the input and output optical fibers are further transmitted through the plug to the output transmission line when the plug is in said state of insertion.

8. The assembly as set forth in claim 6, wherein:
the input and output optical transmission lines of the plug are perpendicular to the input and output optical fibers;
when the plug is in said state of insertion, an end of the input optical transmission line is aligned with the input optical fiber and an end of the output optical transmission line is aligned with the output optical fiber;
the ends of the input and output optical transmission lines, for inputting and outputting optical signals to and from the corresponding input and output optical fibers, are cut at an angle of 45 degrees to form cut planes; and
GRIN lenses are attached to the cut planes by depositing a thin film.

9. The assembly as set forth in claim 6, wherein the input and output optical transmission lines of the plug are perpendicular to the input and output optical fibers, further comprising:
a first mirror disposed and oriented for reflecting the optical signal transmitted from the input optical fiber so that the reflected optical signal is incident on the input optical transmission line when the plug is in said insertion state; and a second mirror disposed and oriented for reflecting the optical signal outputted from the output optical transmission line so that the reflected optical signal is incident on the output optical fiber when the plug is in said insertion state.

10. The assembly as set forth in claim 2, wherein:
the input and output optical transmission lines of the plug are perpendicular to the input and output optical fibers;
when the plug is in said state of insertion, an end of the input optical transmission line is aligned with the input optical fiber and an end of the output optical transmission line is aligned with the output optical fiber;
the ends of the input and output optical transmission lines, for inputting and outputting optical signals to and from the corresponding input and output optical fibers, are cut at an angle of 45 degrees to form cut planes; and
GRIN lenses are attached to the cut planes by depositing a thin film.

11. The assembly as set forth in claim 2, wherein the input and output optical transmission lines of the plug are perpendicular to the input and output optical fibers, further comprising:
a first mirror disposed and oriented for reflecting the optical signal transmitted from the input optical fiber so that the reflected optical signal is incident on the input optical transmission line when the plug is in said insertion state; and
a second mirror disposed and oriented for reflecting the optical signal outputted from the output optical transmission line so that the reflected optical signal is incident on the output optical fiber when the plug is in said insertion state.

12. The assembly as set forth in claim 1, wherein:
the input and output optical transmission lines of the plug are perpendicular to the input and output optical fibers;
when the plug is in said state of insertion, an end of the input optical transmission line is aligned with the input optical fiber and an end of the output optical transmission line is aligned with the output optical fiber;
the ends of the input and output optical transmission lines, for inputting and outputting optical signals to and from the corresponding input and output optical fibers, are cut at an angle of 45 degrees to form cut planes; and
GRIN lenses are attached to the cut planes by depositing a thin film.

13. The assembly as set forth in claim 12, wherein said corresponding positions are mutually, rectilinearly aligned.

14. The assembly as set forth in claim 1, wherein the input and output optical transmission lines of the plug are perpendicular to the input and output optical fibers, further comprising:
a first mirror disposed and oriented for reflecting the optical signal transmitted from the input optical fiber so that the reflected optical signal is incident on the input optical transmission line when the plug is in said insertion state; and
a second mirror disposed and oriented for reflecting the optical signal outputted from the output optical transmission line so that the reflected optical signal is incident on the output optical fiber when the plug is in said insertion state.

15. The assembly as set forth in claim 14, wherein said corresponding positions are mutually, rectilinearly aligned.

16. The assembly as set forth in claim 1, wherein the input and output fibers have respective ends, said assembly further comprising GRIN (Gradient Index) lenses installed at the ends of the input and output optical fibers by depositing a thin film at said ends to improve rectilinear propagation of the optical signals so that said optical signals transmitted through the input and output optical fibers when the plug is in said state of non-insertion pass from the end of one of the input and output fibers, through the connection hole, and onto the end of the other of the input and output fibers.

17. The assembly as set forth in claim 16, wherein said corresponding positions are mutually, rectilinearly aligned.

18. The assembly as set forth in claim 17, wherein:
the input and output optical transmission lines of the plug are perpendicular to the input and output optical fibers;
when the plug is in said state of insertion, an end of the input optical transmission line is aligned with the input optical fiber and an end of the output optical transmission line is aligned with the output optical fiber;
the ends of the input and output optical transmission lines, for inputting and outputting optical signals to and from the corresponding input and output optical fibers, are cut at an angle of 45 degrees to form cut planes; and
GRIN lenses are attached to the cut planes by depositing a thin film.

19. The assembly as set forth in claim 17, wherein the input and output optical transmission lines of the plug are perpendicular to the input and output optical fibers, further comprising:
a first mirror disposed and oriented for reflecting the optical signal transmitted from the input optical fiber so that the reflected optical signal is incident on the input optical transmission line when the plug is in said insertion state; and
a second mirror disposed and oriented for reflecting the optical signal outputted from the output optical transmission line so that the reflected optical signal is incident on the output optical fiber when the plug is in said insertion state.

20. The assembly as set forth in claim 1, wherein said optical signals transmitted through the input and output optical fibers are further transmitted through the plug to the output transmission line when the plug is in said state of insertion.

* * * * *